350-3.7 SR
XR 3,862,428
1-21-75

United States Patent

Waters

[11] 3,862,428
[45] Jan. 21, 1975

[54] HOLOGRAPHIC SPATIAL ENCODER

[75] Inventor: James P. Waters, Rockville, Conn.
[73] Assignee: United Aircraft Corporation, East Hartford, Conn.

[22] Filed: Oct. 11, 1973
[21] Appl. No.: 405,607

[52] U.S. Cl. .......... 250/570, 250/231 SE, 350/3.5
[51] Int. Cl. .......... G01d 5/34, H01s 4/00
[58] Field of Search .......... 250/550, 570, 231 SE; 340/347 P, 173 LM; 350/3.5

[56] References Cited

UNITED STATES PATENTS 3,731,373 5/1973 Johnson .......... 350/3.5 X

Primary Examiner—James W. Lawrence
Assistant Examiner—Davis L. Willis
Attorney, Agent, or Firm—Donald F. Bradley

[57] ABSTRACT

A hologram in the form of a hologram disk is constructed from an optical encoder disk containing binary information. The hologram disk may be mounted on a shaft for rotation therewith as in conventional encoders. The hologram disk is illuminated by a reconstruction beam such as a laser beam to form an image of the original optical encoder disk. An array of photodetectors positioned adjacent the reconstructed image reads out the binary information contained in the encoder disk.

1 Claim, 4 Drawing Figures

3862428
OR IN 250/570

PATENTED JAN 21 1975

3,862,428

HOLOGRAPHIC SPATIAL ENCODER

BACKGROUND OF THE INVENTION

1. Field of the Invention

This invention is directed to a method and apparatus for converting analog output data into discrete digital quantities using a hologram as a spatial encoder.

2. Description of the Prior Art

The spatial encoder is the most direct method of converting analog to digital numbers. The most common and advantageous form of conventional electronic encoder is a circular disk with the codes inset in concentric conducting metal rings. An electronic probe connects each concentric pattern and a circuit reads the patterns that are in contact with the electronic probes, thus determining the proper binary number which indicates the digital position of the encoder disk. At present typical commercial units using this type of construction have coded zones on disks geared together at various gear ratios, and with multiple revolutions of the input shaft can produce $2^{15}$ or 32,768 counts.

Conventional optical encoders have disks which consist of transparent and opaque areas in concentric rings, similar to the conducting metal rings on the electrical encoders. These opaque and transparent sections contain the cyclic-binary code which is read by means of a light source that passes light through the coded disk onto light sensitive cells which read out the desired digital number. This type of encoder is commercially available in several sizes capable of reading up to $2^{17}$ or 131,072 counts per revolution. A typical prior art optically encoded disk and read out system is described in U.S. Pat. No. 3,573,471.

In addition to the digital conversion units there are nonlinear conversion units which can convert analog information to sine, cosine and other trigonometric values. Data conversion rates of conventional electrical and optical encoders have been reported as high as 1.5 million readings/second.

SUMMARY OF THE INVENTION

The present invention is an improvement over the conventional prior art encoders wherein a hologram of the coded binary disk is used as the encoder instead of the usual electronic or optical disk. The holographic encoder is mounted on a rotating shaft and is made so that it reconstructs a spatial geometric configuration which represents the code of the numbers to be read. The holographic encoder of the present invention has several advantages over existing optical or electrical encoders including its insensitivity to dust or other foreign matter which causes noise problems on conventional encoders, its insensitivity to rotational wobble, and its elimination of the need for rotating large disks which limits the maximum rotational acceleration and thus increases data acquisition times.

In accordance with a preferred embodiment of the present invention a hologram is made of a conventional coded binary disk on an annular photographic plate, and after photographic processing the hologram is mounted on a rotating shaft. The coded information is read out by illuminating the hologram with a monochromatic light source such as a laser which reconstructs an image of the original coded binary disk. The reconstructed image consists of light sources where the transparent portions of the original coded binary disk were located. As the hologram rotates about the shaft the reconstructed image also rotates. By using stationary detectors along the radius of the reconstructed image, the light emitting portions will be detected and the encoded data read out.

DESCRIPTION OF THE PREFERRED EMBODIMENT

Figure 1:
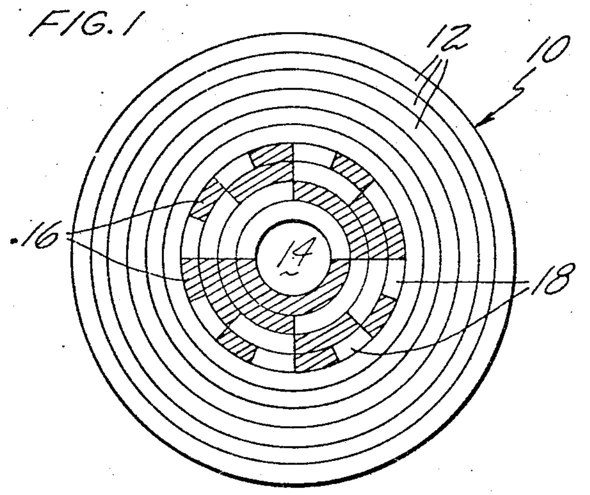
FIG. 1 shows a typical optical encoder disk.

Referring specifically to FIG. 1 there is shown a typical optical encoder disk as is known in the prior art on which binary information is stored on discrete tracks radially spaced on an annular rotatable member 10. As shown the disk incorporates ten circumferentially extending and radially spaced tracks 12 surrounding a centrally located hole 14 through which the disk may be mounted on a shaft for rotation therewith. The number of tracks will vary with the particular application. A typical binary code is shown as applied to the innermost four tracks, the code consisting of a pattern of opaque portions 16 and transparent portions 18 which are contained in the member 10. It is to be understood that all tracks contain binary information, the coding pattern being shown only on the four innermost tracks for purposes of clarity and being representative of the type of encoding commonly used. Typically, the encoder disk is formed from a transparent glass plate with one surface coated with a photographic emulsion and which has the binary information recorded thereon by photographic means, the information being read out at a later time by one or more light sources and detectors for converting the data into electrical signals.

In the preferred embodiment of the present invention, a hologram is made of a binary encoder disk similar to that shown in FIG. 1, and an image of the original encoder disk is reconstructed from which the desired data is read out. A binary coded disk consisting of the desired transparent and opaque areas is plotted out on an enlarged scale, the size being determined by the eventual desired resolution of the final encoder. The enlarged encoder disk is then photoreduced to a size which is convenient for the system. For example, the original encoder disk may be about 1 meter in diameter, the photoreduced size being 10 centimeters in diameter. With 10 concentric rings the outer ring will have a division spacing of about 0.307 mm./division providing an accuracy of ± 20 minutes.

Figure 2:
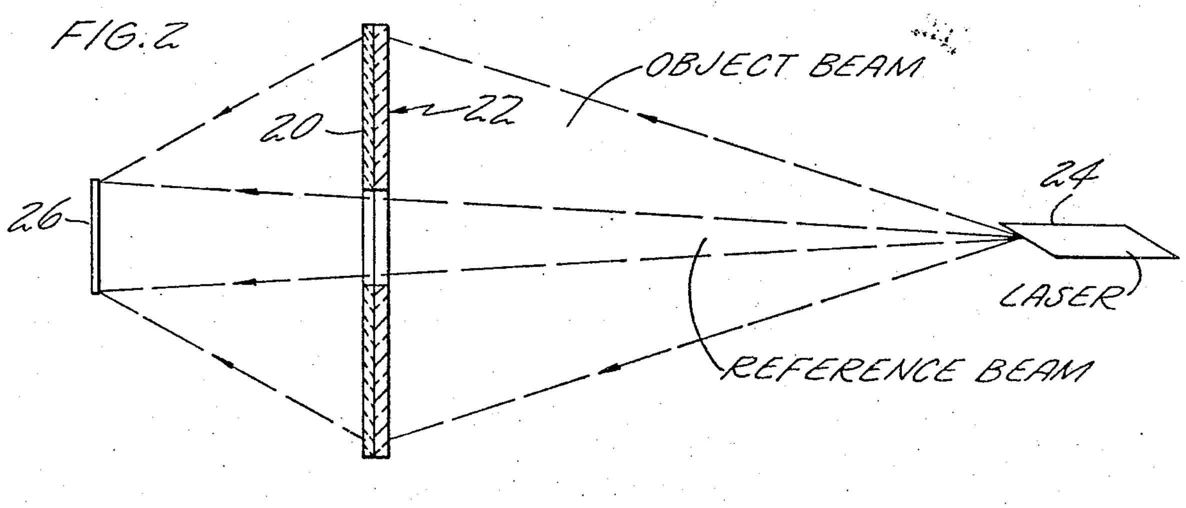
FIG. 2 shows schematically a system for constructing a hologram of the encoder disk of FIG. 1.

Once the reduced optical encoder disk is prepared, a back lighted hologram is then made of the disk on an annular photographic plate which is preferably smaller than the photoreduced encoder disk. Referring to FIG. 2 the photoreduced encoder disk 20 is supported on a ground glass support member 22 and is illuminated by a point source of monochromatic light such as produced by a laser 24. The annular photographic plate 26 on which the hologram is formed is positioned to receive both the direct illumination from the laser 24 which passes through the hole in the center of the encoder disk 20 and the ground glass 22 as well as the phase information produced by each incremental point of the encoder disk illuminated by the laser beam. The two sources of light information are known in the holography art as the reference beam and the object beam, the intersection of both beams at the photographic plate 26 producing the interference pattern thereon to form the hologram.

After the photographic plate 26 is developed by conventional photographic processing, the plate 26 (now referred to as the hologram plate) is mounted on a rotating shaft such as by means of a small metal balancing hub to obtain overall balance of the rotating system. The coded information on the hologram plate 26 is then read out by illuminating the hologram plate 26 with a monochromatic light source such as a laser beam or conventionally filtered white light which reconstructs an image of the original coded disk.

Figure 3:
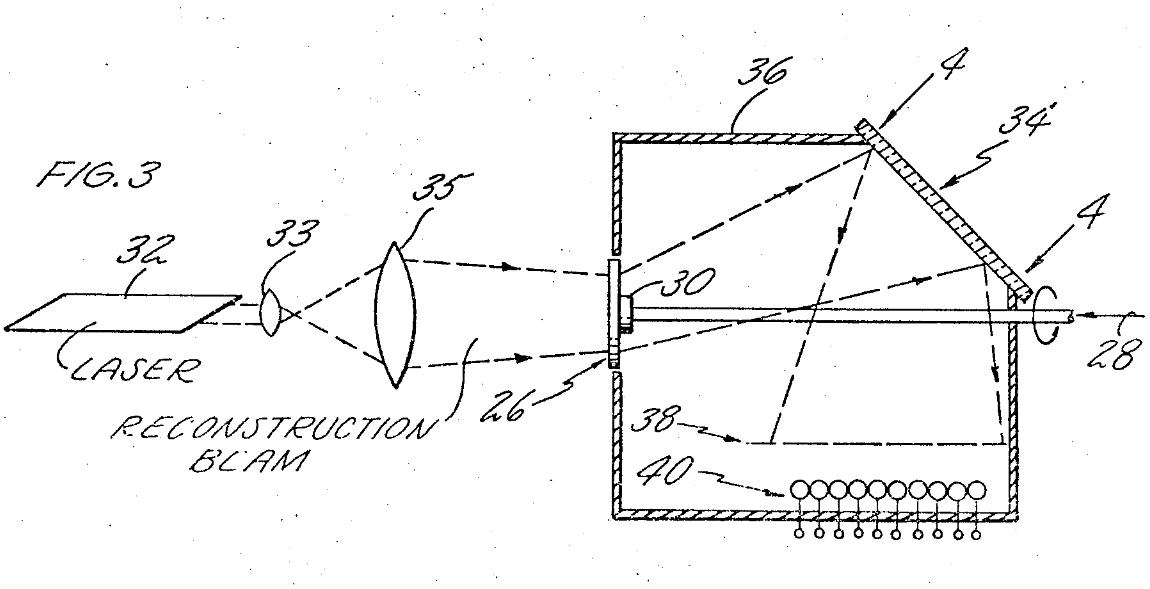
FIG. 3 shows schematically a preferred apparatus for reconstructing the image of the encoder disk from the hologram.

In order to reconstruct a projectable image from hologram plate 26 it is also necessary to illuminate the plate with a conjugate wavefront to that used in the construction step. One apparatus for performing the reconstruction using a conjugate wavefront is shown in FIG. 3. The hologram plate 26 is mounted on a rotating shaft 28 to which it is attached by balance hub 30. A conjugate wavefront is formed by expanding the beam of light from point source 32 using lens 33 and converging the expanded beam with lens 35. The conjugate wavefront will be formed at the point where the wavefront curvature of the reconstruction beam is exactly opposite to the curvature of the reference beam wavefront originally used to form the hologram. When the reconstruction beam with its conjugate wavefront illuminates the hologram plate 26, an undistorted real image of the encoder disk is reconstructed. The reconstructed light is reflected by a mirror 34 mounted within an enclosure 36 so that a real image of the encoder disk is formed at plane 38.

An array of ten stationary photodetectors 40 is mounted adjacent the plane of the reconstructed image 38 of the encoder disk along the radius thereof. The reconstructed image 38 consists of reconstructed points of light at the location of the transparent portions of the original encoder disk, and as the hologram plate 26 rotates about the shaft the reconstructed image 38 also rotates. The light emitting portions of the image will be detected by detectors 40 and the proper encoded number will be read out.

Figure 4:
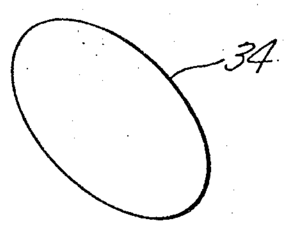
FIG. 4 shows a preferred construction of the mirror of FIG. 3.

FIG. 4 shows the construction of mirror 34 which causes only the desired reconstructed radial portion of the image to be reflected therefrom toward the detector array 40.

The present system is insensitive to dust or other foreign matter on the surface of the hologram plate 26 since a hologram reconstructs an entire image from any portion of itself. The system is also insensitive to wobble because the reconstructed image is insensitive to the angle between the light source and the hologram. In addition since the diameter of the hologram plate need not be the same size as the encoder disk, and since the reconstructed image has no rotational inertia of its own, larger images reconstructed from smaller hologram plates can be rotated at higher speeds than in conventional systems where physical size and rotational inertia become limiting factors, thus decreasing data acquisition times over existing systems.

The performance of the present system may be illustrated by considering a disk four feet in diameter having information encoded thereon at a rate of 200 bits/inch. The final hologram plate, 4 inches in diameter, could read 30,000 counts/revolution or more since the holographic resolution is 10 times higher than is required to record this information. The data acquisition rates which depend on rotational speed, rotational inertia and detector rise time are on the order of 3,000,000 readings per second at a relatively low rotational speed of 100 rps.

Nonlinear functions may also be encoded on the hologram disk as in the case of conventional optical encoders.

While the present invention has been described in terms of its preferred embodiment, it is apparent that numerous changes can be made in its cnstruction and operation without departing from the scope of the invention.

I claim:

1. A method for producing discrete digital output data indicative of the position of rotatable shaft comprising the steps of producing a first optical encoder disk having binary information coded thereon in the form of opaque and transparent portions, photoreducing said optical encoder disk to produce a second optical encoder disk of reduced diameter from said first optical encoder disk, forming on an annular photographic plate a holographic image of said second optical encoder disk, said photographic plate being of reduced diameter from said first and second optical encoder disks, developing said photographic plate, mounting said photographic plate on a rotatable shaft for rotation therewith, illuminating said photographic plate with a coherent optical beam to form a reconstructed real image of the coded binary information contained on said first optical encoder disk, reflecting from an elliptical mirror a selected radial portion of said real image, and detecting the coded information contained in the reflected portion of said image.

* * * * *